United States Patent
Chen

(10) Patent No.: US 7,548,436 B1
(45) Date of Patent: Jun. 16, 2009

(54) DRIVING CIRCUIT AND A POWER CONVERTER INCORPORATING THE SAME

(75) Inventor: Chih-Tai Chen, Taipei (TW)

(73) Assignee: Lite-On Technology, Taipei (TW)

( * ) Notice: Subject to any disclaimer, the term of this patent is extended or adjusted under 35 U.S.C. 154(b) by 0 days.

(21) Appl. No.: 12/213,222

(22) Filed: Jun. 17, 2008

(51) Int. Cl.
*H02M 3/335* (2006.01)
*H02M 3/315* (2006.01)

(52) U.S. Cl. ............... 363/21.04; 363/21.06; 363/21.11

(58) Field of Classification Search ............... 363/21.04, 363/21.06, 21.08, 21.1, 21.11
See application file for complete search history.

(56) References Cited

U.S. PATENT DOCUMENTS 6,038,148 A * 3/2000 Farrington et al. ....... 363/21.06
6,504,739 B2 * 1/2003 Phadke ...................... 363/127
2003/0128556 A1 * 7/2003 Zhang ..................... 363/21.06

* cited by examiner

*Primary Examiner*—Bao Q Vu
(74) *Attorney, Agent, or Firm*—Rosenberg, Klein & Lee

(57) ABSTRACT

A power converter includes: a transformer controlled by a main switch to receive an input power according to a driving signal; a switching circuit outputting a sync signal; and a driving circuit including a dead time controller that includes first and second switches operating according to the sync signal, and an inverse phase generator that includes third and fourth switches and that generates a switching signal. A circuit switch of the switching circuit operates according to the switching signal. Transition of the driving signal from high to low causes the switching signal to transition from low to high with a dead time between a falling edge of the sync signal and a rising edge of the switching signal. Transition of the driving signal from low to high causes the switching signal to transition from high to low with a dead time between a falling edge of the switching signal and a rising edge of the sync signal.

9 Claims, 12 Drawing Sheets

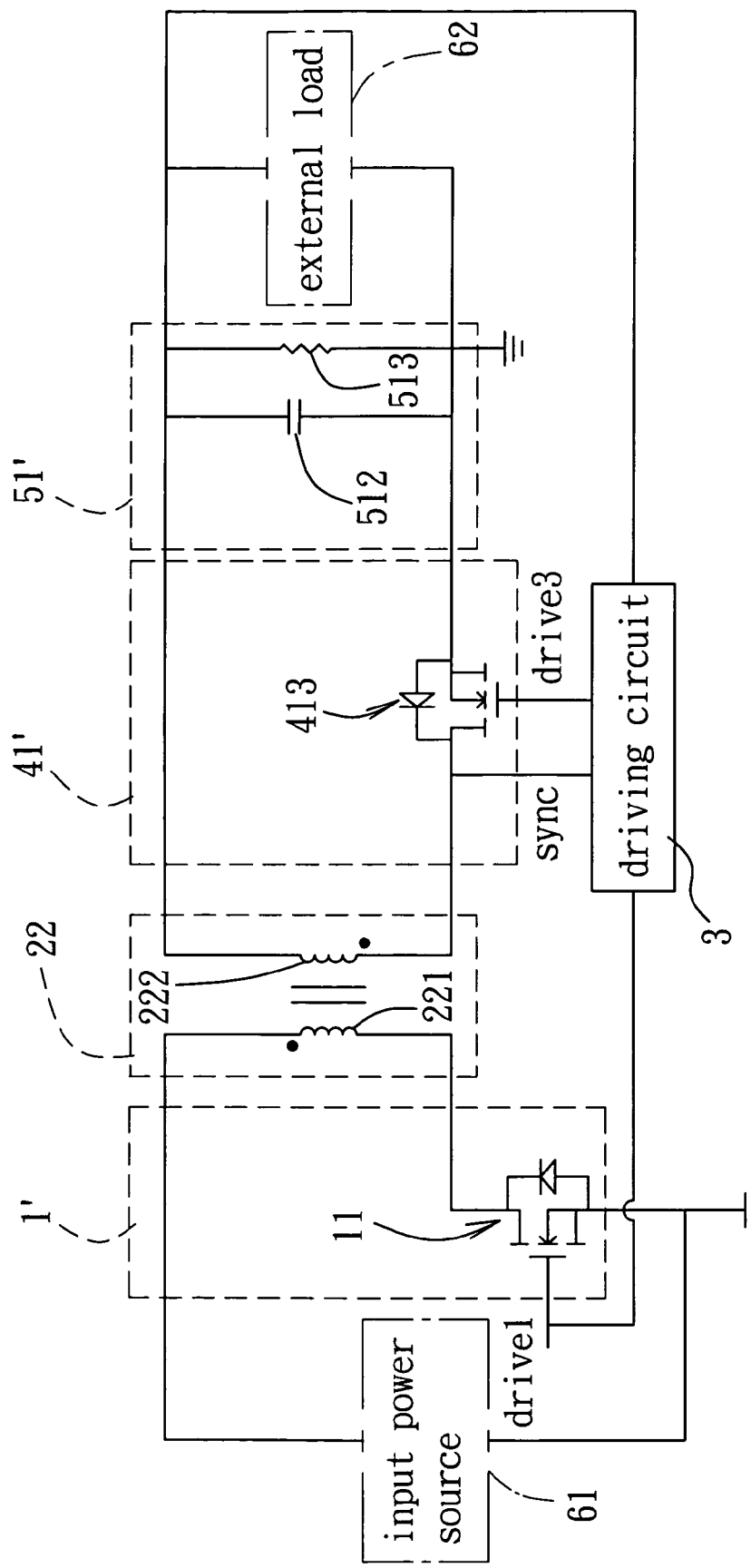
F I G. 6

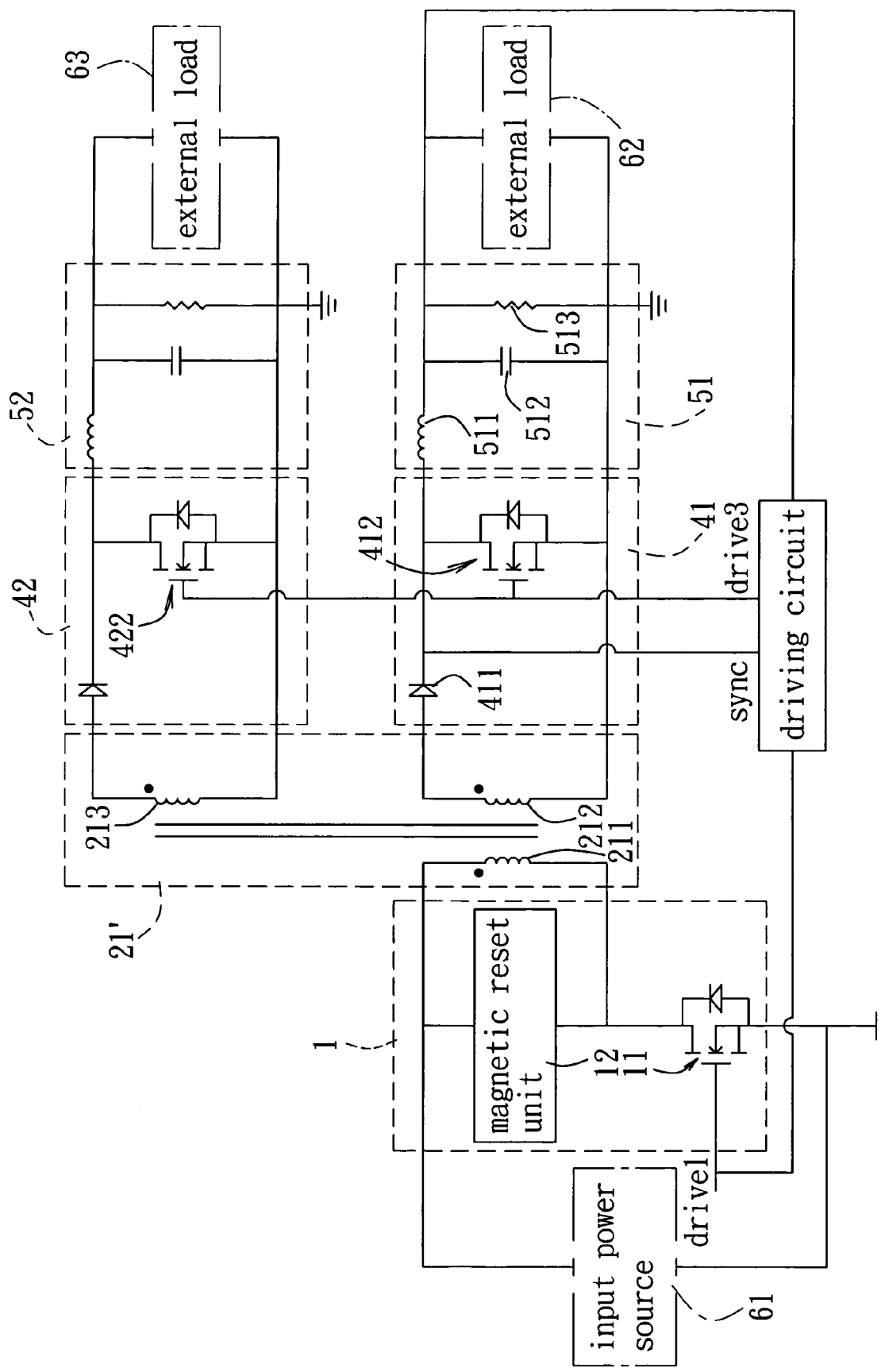
F I G. 8

DRIVING CIRCUIT AND A POWER CONVERTER INCORPORATING THE SAME

CROSS-REFERENCE TO RELATED APPLICATION

This application claims priority of Taiwanese Application No. 097102001, filed on Jan. 18, 2008.

BACKGROUND OF THE INVENTION

1. Field of the Invention

The invention relates to a driving circuit and a power converter incorporating the driving circuit, more particularly to an automatically self-correcting driving circuit and a power converter incorporating the same.

2. Description of the Related Art

As shown in FIG. 1, a conventional self-driven synchronous rectifying power converter includes a main transformer 71, a driving switch 72, a rectifying switch 73, a loop switch 74, an inductor 75, and a capacitor 76. The main transformer 71 includes a primary coil 711 and a secondary coil 712.

The primary coil 711 has a dotted terminal that is adapted to be coupled to an input power source 77, and an un-dotted terminal that is connected electrically to the driving switch 72. The driving switch 72 is driven at a control terminal thereof by a driving signal. An external load 78 is adapted to be coupled in parallel to the capacitor 76.

When the driving switch 72 is turned on by the driving signal, a transfer current is induced in the secondary coil 712 by the primary coil 711 as the input power source 77 supplies input power to the primary coil 711. As a result, the rectifying switch 73 is turned on. At this time, the loop switch 74 is turned off. The transfer current flows from a dotted terminal of the secondary coil 712 toward the inductor 75 so as to charge the capacitor 76 and to transfer the energy to the external load 78.

Subsequently, when the driving switch 72 is turned off by the driving signal, the rectifying switch 73 is turned off. At this time, the loop switch 74 is turned on, and the transfer current flows from the capacitor 76 to the loop switch 74 through the inductor 75 as the capacitor 76 discharges.

Until the driving switch 72 is turned on once again by the driving signal such that the rectifying switch 73 is turned on, while the loop switch 74 remains turned on, the transfer current flows from the capacitor 76 to the inductor 75 with decreasing magnitude. At this time, a portion of the transfer current flows from the inductor 75 to the secondary coil 712 through the loop switch 74 and the rectifying switch 73, such that a reverse current is induced in the primary coil 711 and eventually flows from the primary coil 711 toward the input power source 77. This phenomenon is known as the reverse current phenomenon.

Subsequently, when the magnitude of the transfer current flowing from the capacitor 76 to the inductor 75 becomes zero, the loop switch 74 is turned off, and the transfer current changes back to flowing from the secondary coil 712 to the inductor 75 such that the energy is transferred to the external load 78 again.

In the conventional self-driven synchronous rectifying power converter, upon switching of the driving switch 72 from being turned off to being turned on, the loop switch 74 is unable to switch immediately to being turned off, resulting in the reverse current phenomenon, thereby causing power loss and diminishing the power conversion efficiency.

As shown in FIG. 2, as disclosed in Taiwanese Invention Patent No. I220,084, a conventional synchronous rectifying power converter controlled by a current transformer is suitable for a non-continuous current operating mode. The conventional synchronous rectifying power converter includes a switch transistor 82, a flyback transformer 81, a current transformer 87, a control circuit 84, a switch driving unit 85, a synchronous rectifying switch 83, and a capacitor 86. The flyback transformer 81 includes a first coil 811 and a second coil 812. The current transformer 87 includes a third coil 871 and a fourth coil 872.

The first coil 811 has an un-dotted terminal adapted to be connected electrically to an input power source 88. The switch transistor 82 has a control terminal receiving a drive signal. The capacitor 86 is adapted to be coupled to an external load 89.

When the switch transistor 82 is turned on according to the drive signal received at the control terminal of the switch transistor 82, a voltage corresponding to an input power supplied by the input power source 88 is induced across the fourth coil 872 of the current transformer 87 via the flyback transformer 81 and the third coil 871. The control circuit 84 receives the induced voltage from the fourth coil 872 for controlling the switch driving unit 85 to determine conduction state of the synchronous rectifying switch 83, so as to thereby determine whether the energy is to be transmitted to the external load 89.

When an induced current flows from the capacitor 86 into the second coil 812, and when the switch transistor 82 is turned on, the conventional synchronous rectifying power converter is capable of ensuring that the synchronous rectifying switch 83 is turned off, such that the reverse current does not flow back into the input power source 88. However, the switch driving unit 85 is unable to synchronize control of the synchronous rectifying switch 83 with the drive signal.

A conventional way of solving the problems related to driving capability, reverse current and circuit synchronicity involves utilization of a driving chip. However, the driving chip is costly, thereby increasing the overall cost of the conventional power converters.

SUMMARY OF THE INVENTION

Therefore, the object of the present invention is to provide a power converter having a driving circuit that enhances driving capability, that prevents reverse current, that improves circuit synchronicity, and that is low cost.

According to one aspect of the present invention, there is provided a power converter that is adapted to be connected electrically to an input power source and an external load, and that is adapted for receiving a driving signal that has high and low signal levels. The power converter includes a main switch, a main transformer, a switching circuit, and a driving circuit.

The main switch is operable in one of a conducting state and a non-conducting state according to the driving signal.

The main transformer includes a primary coil adapted to be connected between the input power source and the main switch for receiving an input power supplied by the input power source when the main switch operates in the conducting state, and a secondary coil coupled electromagnetically to the primary coil.

The switching circuit is adapted to be connected electrically between the secondary coil of the main transformer and the external load for transferring energy from the main transformer to the external load. The switching circuit outputs a sync signal that has high and low signal levels, and includes a circuit switch that is operable in one of a conducting state and a non-conducting state.

The driving circuit includes a dead time controller and an inverse phase generator. The dead time controller is connected electrically to the switching circuit, and includes first and second switches. Each of the first and second switches is operable in one of an on state and an off state according to the sync signal outputted by the switching circuit. The inverse phase generator is connected to the dead time controller, and includes a third switch and a fourth switch. The third switch is operable in one of an on state and an off state according to the driving signal. The fourth switch is controlled by the first and third switches to operate in one of an on state and an off state so as to result in a switching signal. The circuit switch of the switching circuit operates in one of the conducting state and the non-conducting state according to the switching signal outputted by the fourth switch.

Transition of the driving signal from the high signal level to the low signal level causes the third switch to operate in the off state and the sync signal to transition from the high signal level to the low signal level, such that the first switch operates in the off state and permits operation of the fourth switch in the on state, and such that the switching signal transitions from a low signal level to a high signal level with a dead time existing between a falling edge of the sync signal and a rising edge of the switching signal.

Transition of the driving signal from the low signal level to the high signal level causes the third switch to operate in the on state and the sync signal to transition from the low signal level to the high signal level, such that the fourth switch is operated in the off state, and such that the switching signal transitions from the high signal level to the low signal level with a dead time existing between a falling edge of the switching signal and a rising edge of the sync signal.

According to another aspect of the present invention, there is provided a driving circuit that is adapted for receiving a sync signal and a driving signal, each having high and low signal levels, and that is adapted for controlling a switch. The driving circuit includes a dead time controller and an inverse phase generator. The dead time controller includes first and second switches, each of which is operable in one of an on state and an off state according to the sync signal. The inverse phase generator is connected to the dead time controller, and includes a third switch and a fourth switch. The third switch is operable in one of an on state and an off state according to the driving signal. The fourth switch is controlled by the first and third switches to operate in one of an on state and an off state so as to result in a switching signal. The switching signal is adapted to control operation of the switch in one of a conducting state and a non-conducting state.

Transition of the driving signal from the high signal level to the low signal level causes the third switch to operate in the off state and the sync signal to transition from the high signal level to the low signal level, such that the first switch operates in the off state and permits operation of the fourth switch in the on state, and such that the switching signal transitions from a low signal level to a high signal level with a dead time existing between a falling edge of the sync signal and a rising edge of the switching signal.

Transition of the driving signal from the low signal level to the high signal level causes the third switch to operate in the on state and the sync signal to transition from the low signal level to the high signal level, such that the fourth switch is operated in the off state, and such that the switching signal transitions from the high signal level to the low signal level with a dead time existing between a falling edge of the switching signal and a rising edge of the sync signal.

BRIEF DESCRIPTION OF THE DRAWINGS

Other features and advantages of the present invention will become apparent in the following detailed description of the preferred embodiments with reference to the accompanying drawings, of which:

FIG. 6 is a schematic circuit diagram of the second preferred embodiment of a power converter according to the present invention;

FIG. 8 is a schematic circuit diagram of the fourth preferred embodiment of a power converter according to the present invention;

DETAILED DESCRIPTION OF THE PREFERRED EMBODIMENTS

Figure 1:
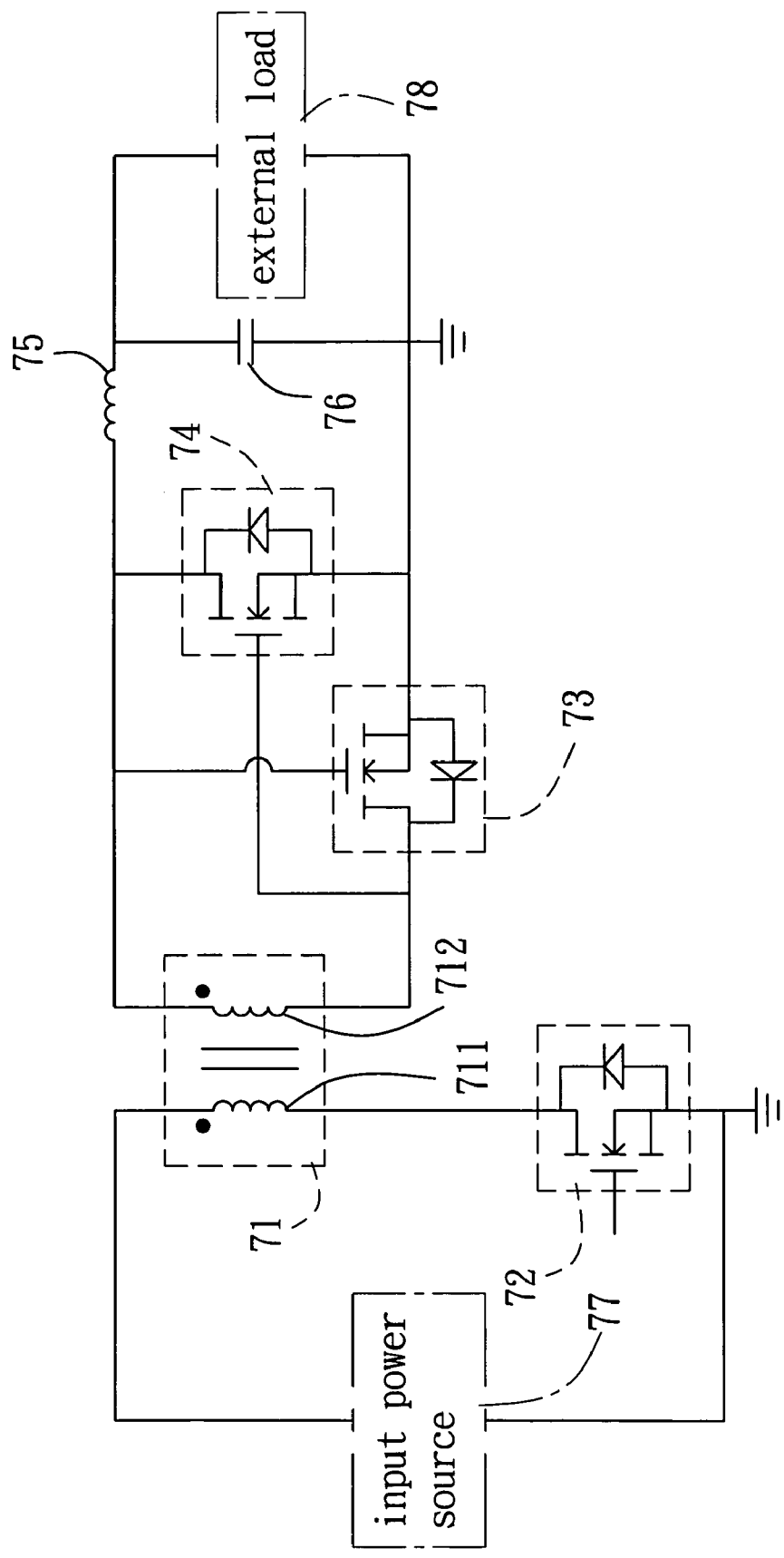
FIG. 1 is a schematic circuit diagram of a conventional self-driven synchronous rectifying power converter.
Figure 2:
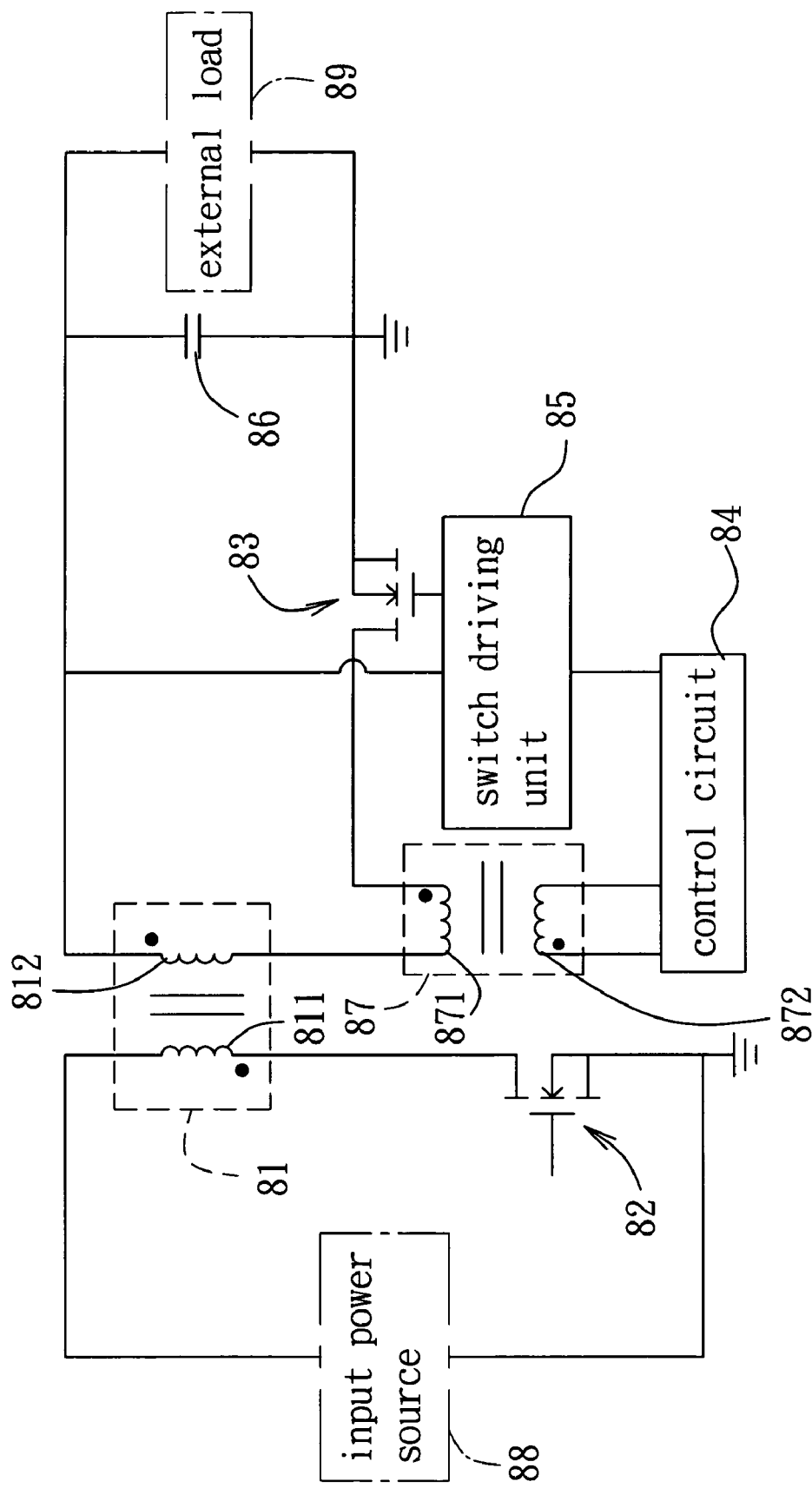
FIG. 2 is a schematic circuit diagram of a conventional synchronous rectifying power converter.

Before the present invention is described in greater detail, it should be noted that like elements are denoted by the same reference numerals throughout the disclosure.

Figure 3:
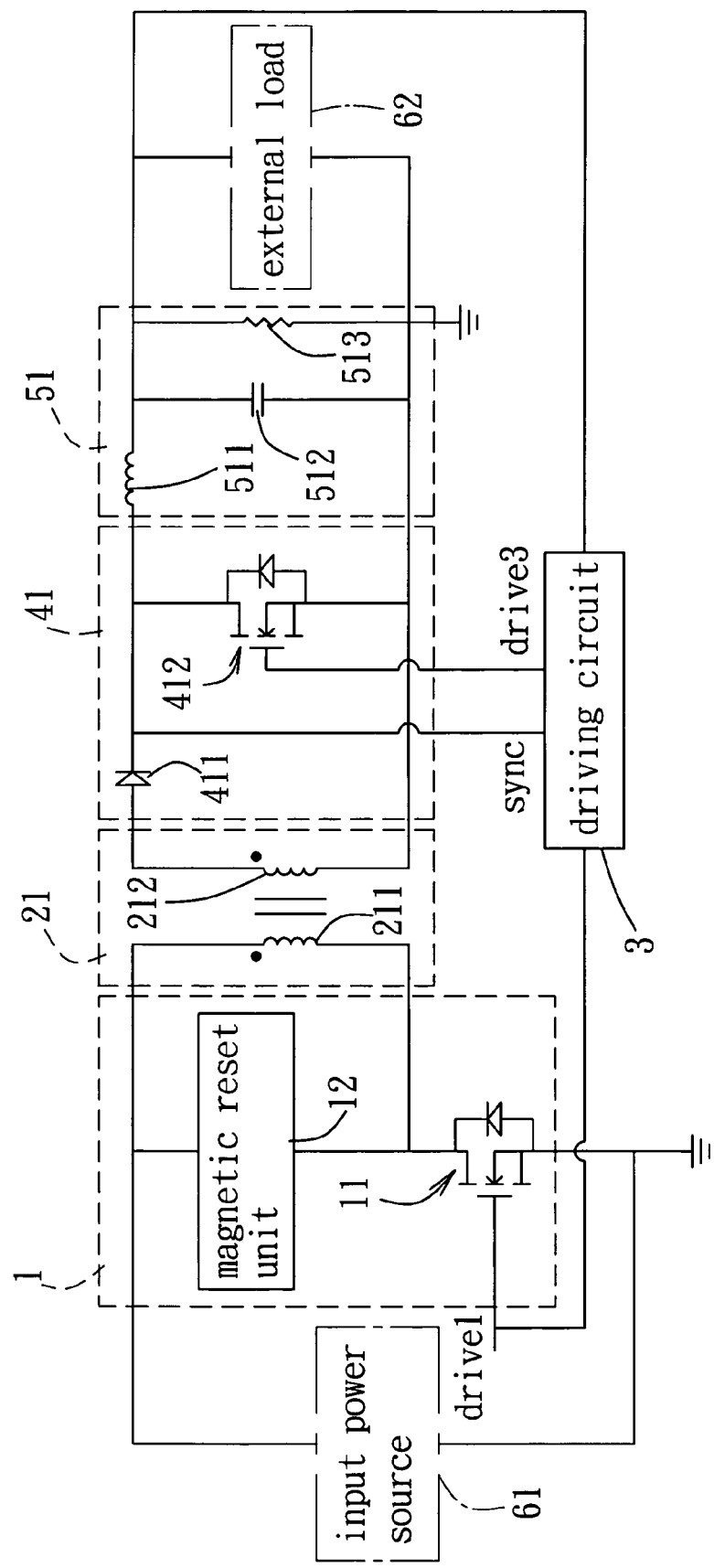
FIG. 3 is a schematic circuit diagram of the first preferred embodiment of a power converter according to the present invention.

Referring to FIG. 3, the first preferred embodiment of a power converter according to the present invention is adapted to be connected electrically to an input power source 61 and an external load 62, and is adapted for receiving a driving signal (also referred to as the first driving signal (drive1)) that has high and low signal levels. In this embodiment, the first driving signal (drive1) is a pulse width modulation (PWM) signal, and the high and low signal levels are both steady state signal levels. The power converter includes an input circuit 1, a main transformer 21, a first switching circuit 41, a driving circuit 3, and a first output circuit 51.

The input circuit 1 includes a main switch 11 and a magnetic reset unit 12 connected in series to the main switch 11. The main switch 11 is operable in one of a conducting state and a non-conducting state according to the first driving signal (drive1). In particular, the main switch 11 includes a first terminal, a second terminal, and a control terminal. The second terminal of the main switch 11 is grounded, and the control terminal of the main switch 11 is adapted to receive the first driving signal (drive1) for controlling operation of the main switch 11 in one of the conducting and non-conducting states. Voltage on the first terminal of the main switch 11, also referred to as the main control voltage, is high when the first driving signal (drive1) is at the low signal level, and is low when the first driving signal (drive1) is at the high signal level. The magnetic reset unit 12 is adapted to be connected electrically between the input power source 61 and the main switch 11.

The main transformer 21 includes a primary coil 211 and a secondary coil 212, and is a forward type transformer in this embodiment. The primary coil 211 is adapted to be connected between the input power source 61 and the first terminal of the main switch 11 of the input circuit 1 for receiving an input power supplied by the input power source 61 when the main switch 11 operates in the conducting state. The secondary coil 212 is coupled electromagnetically to the primary coil 211.

The first switching circuit 41 is adapted to be connected electrically between the secondary coil 212 of the main transformer 21 and the external load 62 for transferring energy from the main transformer 21 to the external load 62. The first switching circuit 41 includes a wave detector 411 and a circuit switch 412. The wave detector 411 has a cathode and an anode. The circuit switch 412 is an inverse phase switch that has a first terminal, a second terminal and a control terminal, and that is operable in one of a conducting state and a non-conducting state. The anode of the wave detector 411 is connected electrically to a-dotted terminal of the secondary coil 212, while the cathode of the wave detector 411 is connected electrically to the first terminal of the circuit switch 412. The first switching circuit 41 outputs a sync signal (sync) that has high and low signal levels at the cathode of the wave detector 411. Furthermore, the second terminal of the circuit switch 412 is grounded. In other words, the sync signal (sync) is the voltage across the first and second terminals of the circuit switch 412. The wave detector 411 is a diode in this embodiment, but is not limited thereto in other embodiments of the present invention.

The first output circuit 51 is adapted to be connected electrically between the first switching circuit 41 and the external load 62. The first output circuit 51 includes an output inductor 511, an output resistor 513, and an output capacitor 512. The output inductor 511 and the output resistor 13 are series-connected between the first and second terminals of the circuit switch 412 of the first switching circuit 41. In addition, the output capacitor 512 is connected in parallel to the output resistor 513 and is adapted to be connected in parallel to the external load 62. The first output circuit 51 permits transfer of energy from the first switching circuit 41 to the external load 62 when the circuit switch 412 of the first switching circuit 41 operates in the non-conducting state, and dissipates energy to the circuit switch 412 of the first switching circuit 41 when the circuit switch 412 operates in the conducting state.

Figure 4:
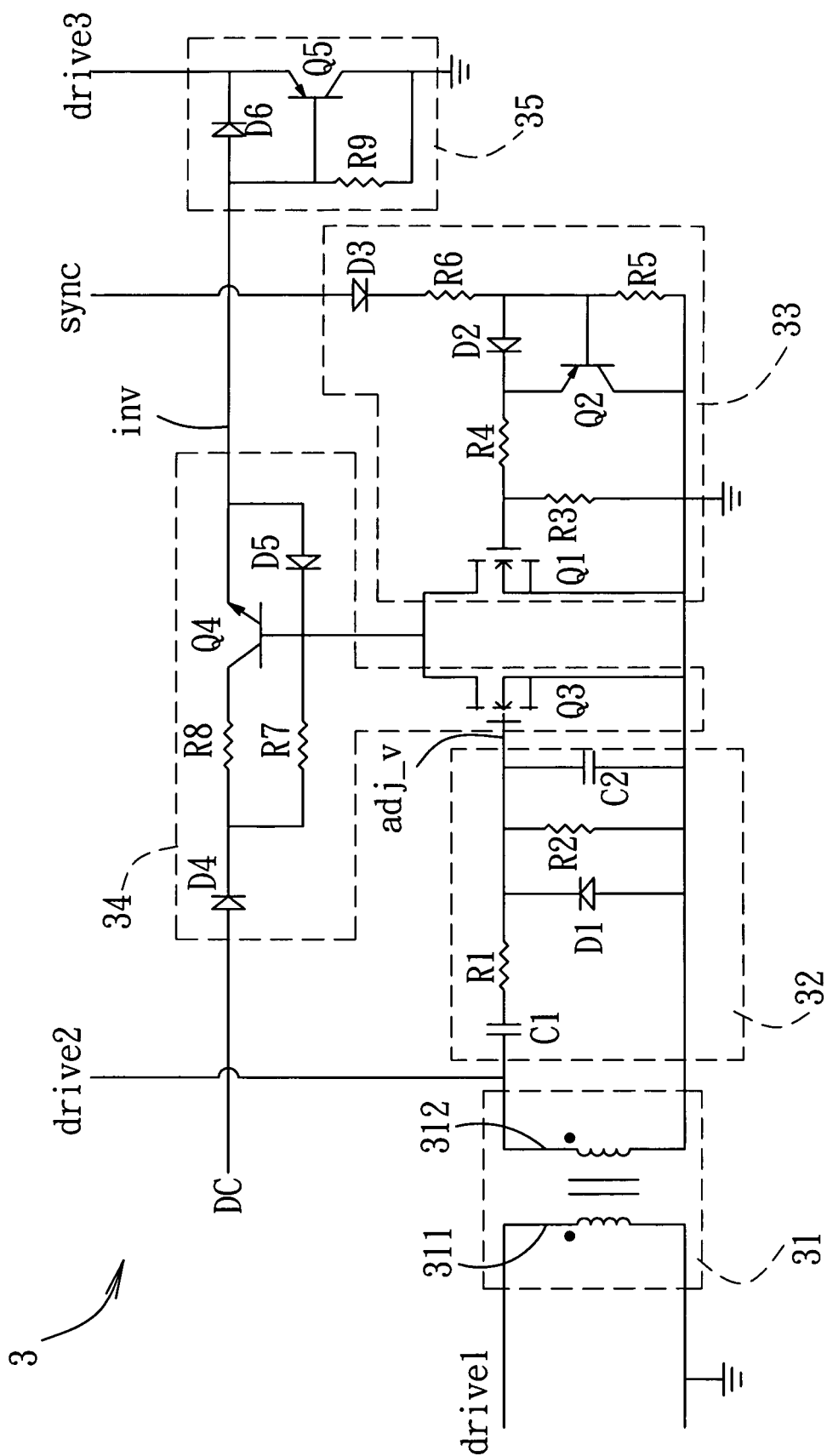
FIG. 4 is a schematic circuit diagram of a driving circuit according to the first preferred embodiment.

With reference to FIG. 4, the driving circuit 3 receives the first driving signal (drive1) and outputs a switching signal. In this embodiment, the switching signal includes a third driving signal (drive3). The driving circuit 3 includes an isolator 31, a level adjuster 32, a dead time controller 33, an inverse phase generator 34, and an accelerator 35.

The isolator 31 isolates noise signals from the first driving signal (drive1) so as to result in an isolated driving signal, also referred to as the second driving signal (drive2). The isolator 31 includes a first isolating coil 311 and a second isolating coil 312. The first isolating coil 311 includes a dotted terminal that is adapted to receive the first driving signal (drive1), and a un-dotted terminal that is grounded. The second isolating coil 312 is coupled electromagnetically to the first isolating coil 311, and has a dotted terminal and an un-dotted terminal. The un-dotted terminal of the second isolating coil 312 is grounded. The isolated driving signal (drive2) is outputted at the dotted terminal of the second isolating coil 312. The isolator 31 is a transformer in this embodiment, but is not limited thereto in other embodiments of the present invention. For instance, the isolator 31 may be an optical coupler in other embodiments of the present invention.

The level adjuster 32 performs direct current (DC) bias isolation and voltage level control processing on the second driving signal (drive2) so as to result in a post-level-adjustment signal (adj_v). The level adjuster 32 includes a first capacitor (C1), a second capacitor (C2), a first resistor (R1), a second resistor (R2), and a first diode (D1). The first capacitor (C1) is connected electrically to the dotted terminal of the second isolating coil 312 so as to receive the second driving signal (drive2) therefrom. The first capacitor (C1), the first resistor (R1) and the second resistor (R2) are connected in series to each other between the dotted and un-dotted terminals of the second isolating coil 312. The second capacitor (C2) and the first diode (D1) are connected in parallel to the second resistor (R2). The first diode (D1) has an anode that is grounded, and a cathode that is connected electrically between the first and second resistors (R1, R2). The post-level-adjustment signal (adj_v) is outputted at the cathode of the first diode (D1).

The dead time controller 33 is connected electrically to the first switching circuit 41 (shown in FIG. 3), and includes first and second switches (Q1, Q2), each of which is operable in one of an on state and an off state according to the sync signal (sync) outputted by the first switching circuit 41. The dead time controller 33 further includes a third resistor (R3), a fourth resistor (R4), a fifth resistor (R5), a sixth resistor (R6), a second diode (D2), and a third diode (D3).

The third resistor (R3), the fourth resistor (R4), the second diode (D2) and the fifth resistor (R5) are series-connected in sequence. The first switch (Q1) has a first terminal, a control terminal connected electrically to a common node of the third and fourth resistors (R3, R4), and a grounded second terminal. The second switch (Q2) has a first terminal connected electrically to a cathode of the second diode (D2), a control terminal connected electrically to an anode of the second diode (D2), and a grounded second terminal. The sixth resistor (R6) is connected electrically between the control terminal of the second switch (Q2) and a cathode of the third diode (D3), which has an anode for receiving the sync signal (sync) outputted by the first switching circuit 41 (as shown in FIG. 3).

The inverse phase generator 34 is connected to the dead time controller 33, and includes a third switch (Q3) and a fourth switch (Q4). The third switch (Q3) is operable in one of an on state and an off state according to the post-level-adjustment signal (adj_v). The fourth switch (Q4) is controlled by the first and third switches (Q1, Q3) to operate in one of an on state and an off state so as to result in a primary switching signal (inv), which is used in turn to generate the switching signal, which is the third driving signal (drive3) in this embodiment.

In this embodiment, the inverse phase generator 34 further includes a fourth diode (D4), a fifth diode (D5), a seventh resistor (R7), and an eighth resistor (R8). The third switch (Q3) has a control terminal for receiving the post-level-adjustment signal (adj_v), a first terminal connected electrically to the first terminal of the first switch (Q1) of the dead time controller 33, and a grounded second terminal. The first terminal of the third switch (Q3) is further connected electrically to a cathode of the fifth diode (D5) and a control terminal of the fourth switch (Q4). The seventh and eighth resistors (R7, R8) are connected in series between the control terminal and the first terminal of the fourth switch (Q4). The fourth diode (D4) has an anode that is adapted to receive a direct-current (DC) power, and a cathode that is connected to a common node of the seventh and eighth resistors (R7, R8). The fifth diode (D5) further has an anode connected electrically to a second terminal of the fourth switch (Q4). The inverse phase generator 34 outputs the primary switching signal (inv) having a phase opposite to that of the post-level-adjustment signal (adj_v) at the anode of the fifth diode (D5). In this embodiment, the DC power is the voltage adapted to be provided to the external load 62, but may be an external power source in other embodiments of the present invention.

The accelerating unit 35 includes a fifth switch (Q5) a sixth diode (D6), and a ninth resistor (R9). The ninth resistor (R9) is connected electrically between a control terminal and a grounded second terminal of the fifth switch (Q5). The sixth diode (D6) has a cathode connected electrically to a first terminal of the fifth switch (Q5), and an anode connected to the control terminal of the fifth switch (Q5) and the anode of the fifth diode (D5) of the inverse phase generator 34 for receiving the primary switching signal (inv) therefrom. The second terminal of the fifth switch (Q5) is grounded. The third driving signal (drive3) is outputted at the first terminal of the fifth switch (Q5).

The accelerating unit 35 is connected to the first switching circuit 41 (as shown in FIG. 3), and accelerates transition of the circuit switch 412 of the first switching circuit 41 from the conducting state to the non-conducting state when the fifth switch (Q5) is turned on upon transition of the primary switching signal (inv) outputted by the fourth switch (Q4) from the high signal level to the low signal level. The circuit switch 412 of the first switching circuit 41 operates in one of the conducting state and the non-conducting state according to the third driving signal (drive3) outputted by the fifth switch (Q5).

When the third driving signal (drive3) transitions from the high signal level to the low signal level, while the fifth switch (Q5) is turned on, a parasitic capacitance of the circuit switch 412 discharges through the fifth switch (Q5) so as to accelerate the transition of the circuit switch 412 from the conducting state to the non-conducting state.

Transition of the first driving signal (drive1) from the high signal level to the low signal level causes the third switch (Q3) to operate in the off state and the sync signal (sync) to transition from the high signal level to the low signal level, such that the first switch (Q1) operates in the off state and permits operation of the fourth switch (Q4) in the on state, and such that the third driving signal (drive3) transitions from a low signal level to a high signal level with a dead time existing between a falling edge of the sync signal (sync) and a rising edge of the third driving signal (drive3).

Transition of the first driving signal (drive1) from the low signal level to the high signal level causes the third switch (Q3) to operate in the on state and the sync signal (sync) to transition from the low signal level to the high signal level, such that the fourth switch (Q4) is operated in the off state, and such that the third driving signal (drive3) transitions from the high signal level to the low signal level with a dead time existing between a falling edge of the third driving signal (drive3) and a rising edge of the sync signal (sync).

The dead time existing between the falling edge of the sync signal (sync) and the rising edge of the third driving signal (drive3), and the dead time existing between the falling edge of the third driving signal (drive3) and the rising edge of the sync signal (sync) ensure that the sync signal (sync) and the third driving signal (drive3) are not simultaneously in the high signal level, such that reverse current does not occur, thereby achieving zero voltage switching (ZVS) and zero current switching (ZCS).

Description with reference to four phases of the first driving signal (drive1) will now be made to illustrate operation of the driving circuit 3. The four phases are respectively the high signal level, the transition from the high signal level to the low signal level, the low signal level, and the transition from the low signal level to the high signal level.

Figure 5:
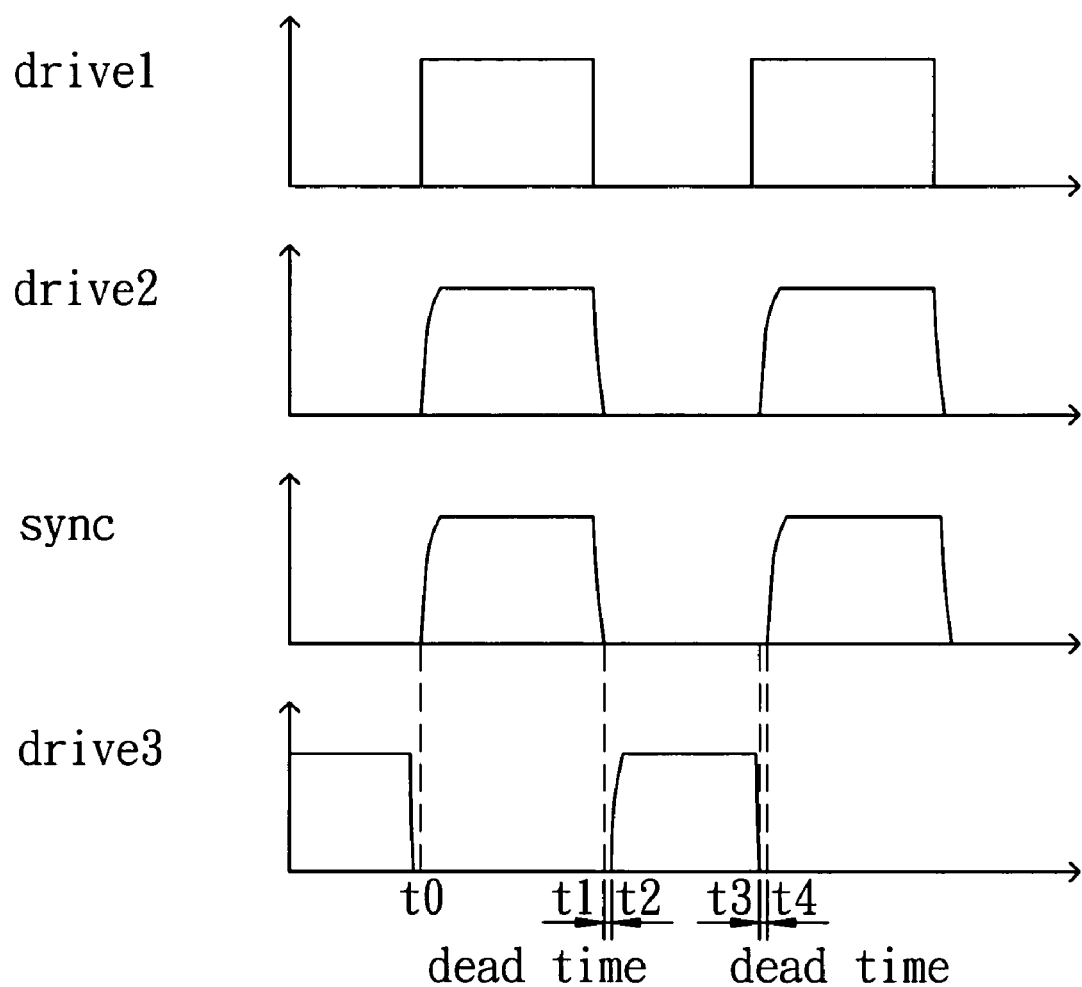
FIG. 5 is a timing diagram of four signals in the driving circuit of the first preferred embodiment.

With reference to FIG. 4 and FIG. 5, when the first driving signal (drive1) is at the high signal level, the high signal level of the sync signal (sync) permits operation of the first switch (Q1) in the on state, and the high signal level of the post-level-adjustment signal (adj_v) permits operation of the third switch (Q3) in the on state. At this time, the second switch (Q2) operates in the off state, the fifth diode (D5) and the fifth switch (Q5) operate in the on state, while the fourth switch (Q4) operates in the off state. As a result, the third driving signal (drive3) is at the low signal level.

When the first driving signal (drive1) transitions from the high signal level to the low signal, a low signal level of the sync signal (sync) permits operation of the first switch (Q1) in the off state, while a low signal level of the post-level-adjustment signal (adj_v) permits operation of the third switch (Q3) in the off state, the second switch (Q2) operates in the on state, the fourth switch (Q4) and the sixth diode (D6) operate in the on state, and the fifth switch (Q5) operates in the off state. Consequently, the third driving signal (drive3) transitions from the low signal level to the high signal level with the dead time existing between the falling edge of the sync signal (sync) and the rising edge of the third driving signal (drive3), i.e., achieving zero voltage switching (ZVS).

When the first driving signal (drive1) is at the low signal level, the low signal level of the sync signal (sync) permits operation of the first switch (Q1) in the off state, and the low signal level of the post-level-adjustment signal (adj_v) permits operation of the third switch (Q3) in the off state. At this time, the second switch (Q2) operates in the on state, the fourth switch (Q4) and the sixth diode (D6) operate in the on state, and the fifth switch (Q5) operates in the off state. As a result, the third driving signal (drive3) is at the high signal level.

When the first driving signal (drive1) transitions from the low signal level to the high signal level, the sync signal (sync) is caused to transition from the low signal level to the high signal level, and the post-level-adjustment signal (adj_v) is caused to transition from the low signal level to the high signal level, such that the first and third switches (Q1, Q3) operate in the on state. In other words, the rising edge of the sync signal (sync) occurs after the rising edge of the first driving signal (drive1). As a result, the second switch (Q2) operates in the off state, the fourth switch (Q4) operates in the off state, and the fifth diode (D5) and the fifth switch (Q5) operate in the on state. Consequently, the third driving signal (drive3) transitions from the high signal level to the low signal level with the dead time existing between the falling edge of the third driving signal (drive3) and the rising edge of the sync signal (sync), thereby achieving zero current switching (ZCS).

It is evident from the above that it is only when the sync signal (sync) is at the low signal level that the third driving signal (drive3) is at the high signal level. In other words, the sync signal (sync) and the third driving signal (drive3) are never simultaneously in the on state so as to ensure zero voltage switching (ZVS) and zero current switching (ZCS).

Reference will now be made to FIG. 3 and FIG. 5 for describing operation of the first preferred embodiment in four different time zones.

From time (t0) to time (t1), the first driving signal (drive1) is at the high signal level such that the main switch 11 operates in the conducting state, and the third driving signal (drive3) generated by the driving circuit 3 is at the low signal level. The circuit switch 412 operates in the non-conducting state according to the low signal level of the third driving signal (drive3). During this time period, an induced current flows from the first terminal of the secondary coil 212 toward the output inductor 511, and energy is transferred to the external load 62 via the output inductor 511.

Upon transition of the first driving signal (drive1) from the high signal level to the low signal level, the sync signal (sync) transitions from the high signal level to the low signal level at time (t1), after which the switching signal (drive3) transitions from the low signal level to the high signal level at time (t2) with the dead time existing between the falling edge of the sync signal (sync) (at time (t1)) and the rising edge of the switching signal (drive3) (at time (t2)), i.e., zero voltage switching (ZVS). From time (t1) to time (t2), the main switch 11 operates in the non-conducting state, and the primary coil 211 dissipates energy to the magnetic reset unit 12. In addition, the circuit switch 412 operates in the non-conducting state, and energy continues to be transferred to the external load 62 via the output inductor 511.

From time (t2) to time (t3), the first driving signal (drive1) is at the low signal level such that the main switch 11 operates in the non-conducting state, and the third driving signal (drive3) generated by the driving circuit 3 is at the high signal level such that the circuit switch 412 operates in the conducting state. During this time period, the primary coil 211 dissipates energy to the magnetic reset unit 12, and the output inductor 511 dissipates energy to the circuit switch 412.

Upon transition of the first driving signal (drive1) from the low signal level to the high signal level, the main switch 11 operates in the conducting state, such that the third driving signal (drive3) transitions from the high signal level to the low signal level at time (t3), after which the sync signal (sync) transitions from the low signal level to the high signal level at time (t4) with the dead time existing between the falling edge (at time (t3)) of the third driving signal (drive3) and the rising edge (at time (t4)) of the sync signal (sync), i.e., zero current switching (ZCS). The circuit switch 412 operates in the non-conducting state immediately after the third driving signal (drive3) transitions to the low signal level at time (t3), such that energy is transferred to the external load 62 via the output inductor 511 from time (t3) to time (t4).

As shown in FIG. 6, the second preferred embodiment of a power converter according to the present invention includes an input circuit 1', a main transformer 22, a driving circuit 3, a first switching circuit 41', and a first output circuit 51'. Since the driving circuit 3 is identical to that of the first preferred embodiment, further details of the same are omitted herein for the sake of brevity.

The input circuit 1' is similar to the input circuit 1 of the first preferred embodiment, but with the magnetic reset unit 12 (as shown in FIG. 3) omitted in the input circuit 1'.

The main transformer 22 is a flyback type transformer, and includes a primary coil 221 and a secondary coil 222. The primary coil 221 is adapted to be connected electrically between the input power source 61 and the first terminal of the main switch 11 of the input circuit 1' for receiving the input power supplied by the input power source 61 when the main switch 11 operates in the conducting state. The secondary coil 222 is coupled electromagnetically to the primary coil 221.

The first switching circuit 41' is adapted to be connected electrically between the secondary coil 222 of the main transformer 22 and the external load 62 for transferring energy from the main transformer 22 to the external load 62. The first switching circuit 41' includes a circuit switch 413, which is an in-phase switch that includes a first terminal, a second terminal, and a control terminal, and that is operable in one of a conducting state and a non-conducting state. The first terminal of the circuit switch 413 is connected electrically to a dotted terminal of the secondary coil 222, the second terminal of the circuit switch 413 is grounded, and the control terminal of the circuit switch 413 is connected to electrically to the driving circuit 3 for receiving the third driving signal (drive3) therefrom. The first switching circuit 41' outputs the sync signal (sync) at the first terminal of the circuit switch 413. In other words, the sync signal (sync) is the voltage across the first and second terminals of the circuit switch 413.

The first output circuit 51' is adapted to be connected electrically between the first switching circuit 41' and the external load 62. The first output circuit 51' includes an output resistor 513 and an output capacitor 512. The output resistor 513 is connected electrically between the un-dotted terminal of the secondary coil 222 and the second terminal of the circuit switch 413 of the first switching circuit 41'. In addition, the output capacitor 512 is connected in parallel to the output resistor 513 and is adapted to be connected in parallel to the external load 62.

Reference will now be made to FIG. 5 and FIG. 6 for describing operation of the second preferred embodiment in four different time zones.

From time (t0) to time (t1), the first driving signal (drive1) is at the high signal level such that the main switch 11 operates in the conducting state, and the third driving signal (drive3) generated by the driving circuit 3 is at the low signal level. The circuit switch 413 operates in the non-conducting state according to the low signal level of the third driving signal (drive3). During this time period, energy is stored in the secondary coil 222.

Upon transition of the first driving signal (drive1) from the high signal level to the low signal level, the sync signal (sync) transitions from the high signal level to the low signal level at time (t1), after which the third driving signal (drive3) transitions from the low signal level to the high signal level at time (t2) with the dead time existing between the falling edge of the sync signal (sync) (at time (t1)) and the rising edge of the third driving signal (drive3) (at time (t2)), i.e., zero voltage switching (ZVS). From time (t1) to time (t2), the main switch 11 operates in the non-conducting state, the circuit switch 413 operates in the non-conducting state, and energy continues to be stored in the secondary coil 222.

From time (t2) to time (t3), the first driving signal (drive1) is at the low signal level such that the main circuit 11 operates in the non-conducting state, and the third driving signal (drive3) generated by the driving circuit 3 is at the high signal level such that the circuit switch 413 operates in the conducting state. During this time period, energy is transferred from the secondary coil 222 to the external load 62.

Upon transition of the first driving signal (drive1) from the low signal level to the high signal level, the main switch 11 operates in the conducting state, such that the third driving signal (drive3) transitions from the high signal level to the low signal level at time (t3), after which the sync signal (sync) transitions from the low signal level to the high signal level at time (t4) with the dead time existing between the falling edge (at time (t3)) of the third driving signal (drive3) and the rising edge (at time (t4)) of the sync signal (sync), i.e., zero current switching (ZCS). The circuit switch 413 operates in the non-conducting state immediately after the third driving signal (drive3) transitions to the low signal level at time (t3), such that energy is stored in the secondary coil 222 from time (t3) to time (t4).

Figure 7:
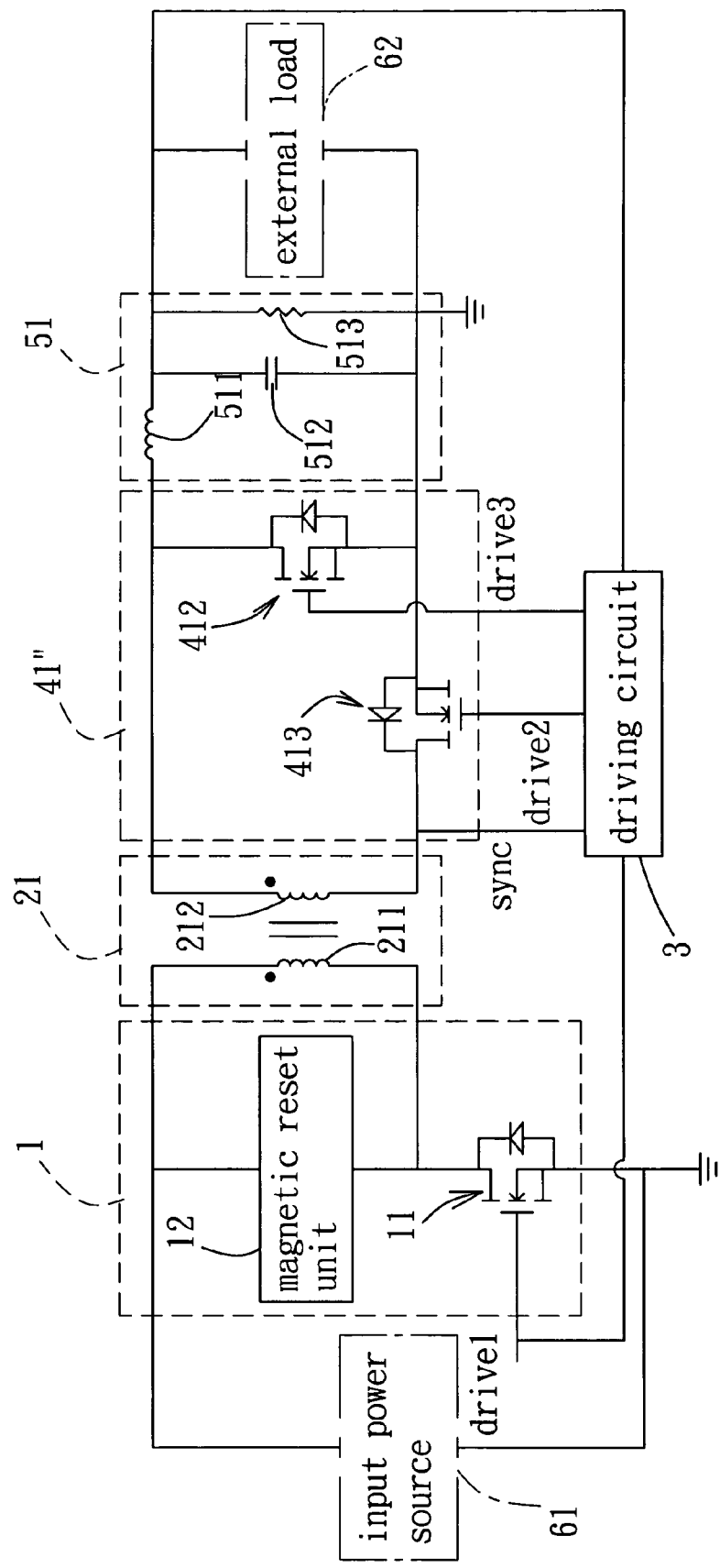
FIG. 7 is a schematic circuit diagram of the third preferred embodiment of a power converter according to the present invention.

As shown in FIG. 7, the third preferred embodiment of a power converter according to the present invention differs from the previous embodiments in that the first switching circuit 41" of the third preferred embodiment includes both the circuit switch 412 of the first preferred embodiment and the circuit switch 413 of the second preferred embodiment, and that the switching signal generated by the driving circuit 3 includes both the second driving signal (drive2) and the third driving signal (drive3) for respectively controlling operation of the circuit switches 412, 413 in one of the conducting state and the non-conducting state. Since other parts of the third preferred embodiment are identical to the first preferred embodiment, further details of the same are omitted herein for the sake of brevity.

For simplicity of illustration, the circuit switch 412 is hereinafter referred to as the first circuit switch 412, and the circuit switch 413 is hereinafter referred to as the second circuit switch 413. Each of the first and second circuit switches 412, 413 includes a first terminal, a second terminal, and a control terminal. The first terminal of the first circuit switch 412 is connected electrically to the dotted terminal of the secondary coil 212. The second terminals of the first and second circuit switches 412, 413 are both grounded. The first terminal of the second circuit switch 413 is connected electrically to the un-dotted terminal of the secondary coil 212, where the sync signal (sync) is obtained. In other words, the sync signal (sync) is the voltage across the first and second terminals of the second circuit switch 413. The control terminal of the first circuit switch 412 is connected to the output circuit 35 of the driving circuit 3 (shown in FIG. 4) for receiving the third driving signal (drive3) therefrom, and the control terminal of the second circuit switch 412 is connected to the dotted terminal of the second isolating coil 312 of the isolator 31 of the driving circuit 3 (shown in FIG. 4) for receiving the second driving signal (drive2) therefrom.

Reference will now be made to FIG. 5 and FIG. 7 for describing operation of the third preferred embodiment in four different time zones.

From time (t0) to time (t1), the first driving signal (drive1) is at the high signal level such that the main switch 11 operates in the conducting state, and the second and third driving signals (drive2, drive3) generated by the driving circuit 3 are respectively at the high and low signal levels. The first circuit switch 412 operates in the non-conducting state according to the low signal level of the third driving signal (drive3) while the second circuit switch 413 operates in the conducting state according to the high signal level of the second driving signal (drive2). During this time period, an induced current flows from the dotted terminal of the secondary coil 212 toward the output inductor 511, and energy is transferred to the external load 62 and the output capacitor 512 via the output inductor 511.

Upon transition of the first driving signal (drive1) from the high signal level to the low signal level, the sync signal (sync) and the second driving signal (drive2) transition from the high signal level to the low signal level at time (t1), after which the third driving signal (drive3) transitions from the low signal level to the high signal level at time (t2) with the dead time existing between the falling edge of the sync signal (sync) (at time (t1)) and the rising edge of the third driving signal (drive3) (at time (t2)), i.e., zero voltage switching (ZVS). From time (t1) to time (t2), the main switch 11 operates in the non-conducting state, the first and second circuit switches 412, 413 operate in the non-conducting state, and energy is transferred to the external load 62 via the output capacitor 512.

From time (t2) to time (t3), the first driving signal (drive1) is at the low signal level such that the main switch 11 operates in the non-conducting state, and the second and third driving signals (drive2, drive3) generated by the driving circuit 3 are respectively at the low and high signal levels such that the first and second circuit switches 412, 413 respectively operate in the conducting and non-conducting states. During this time period, the primary coil 211 dissipates energy to the magnetic reset unit 12 and the output inductor 511 dissipates energy to the first circuit switch 412.

Upon transition of the first driving signal (drive1) from the low signal level to the high signal level, the main switch 11 operates in the conducting state, such that the second driving signal (drive2) transitions from the low signal level to the high signal level, and such that the third driving signal (drive3) transitions from the high signal level to the low signal level at time (t3), after which the sync signal (sync) transitions from the low signal level to the high signal level at time (t4) with the dead time existing between the falling edge (at time (t3)) of the third driving signal (drive3) and the rising edge (at time (t4)) of the sync signal (sync), i.e., zero current switching (ZCS). The second circuit switch 413 operates in the conducting state according to the high signal level of the second driving signal (drive2). The first circuit switch 412 operates in the non-conducting state immediately after the third driving signal (drive3) transitions to the low signal level at time (t3), such that energy is transferred to the external load 62 and the output capacitor 512 via the output inductor 511 from time (t3) to time (t4).

With reference to FIG. 8, the fourth preferred embodiment of a power converter according to the present invention differs from the first preferred embodiment in that the main transformer 21' further includes an additional secondary coil 213, and that the fourth preferred embodiment further includes a second switching circuit 42 and a second output circuit 52 connected to another external load 63.

Since the structure of the second switching circuit 42 is similar to that of the first switching circuit 41, and the structure of the second output circuit 52 is similar to that of the first output circuit 51, further details of the same are omitted herein for the sake of brevity.

The main transformer 21' is a forward type transformer. The secondary coils 212, 213 are respectively connected electrically in parallel to the first and second switching circuits 41, 42, and are each coupled electromagnetically to the primary coil 211.

Since operations of the fourth preferred embodiment are similar to those disclosed for the first preferred embodiment, and can be readily deduced therefrom, further details of the same are omitted herein for the sake of brevity.

Figure 9:
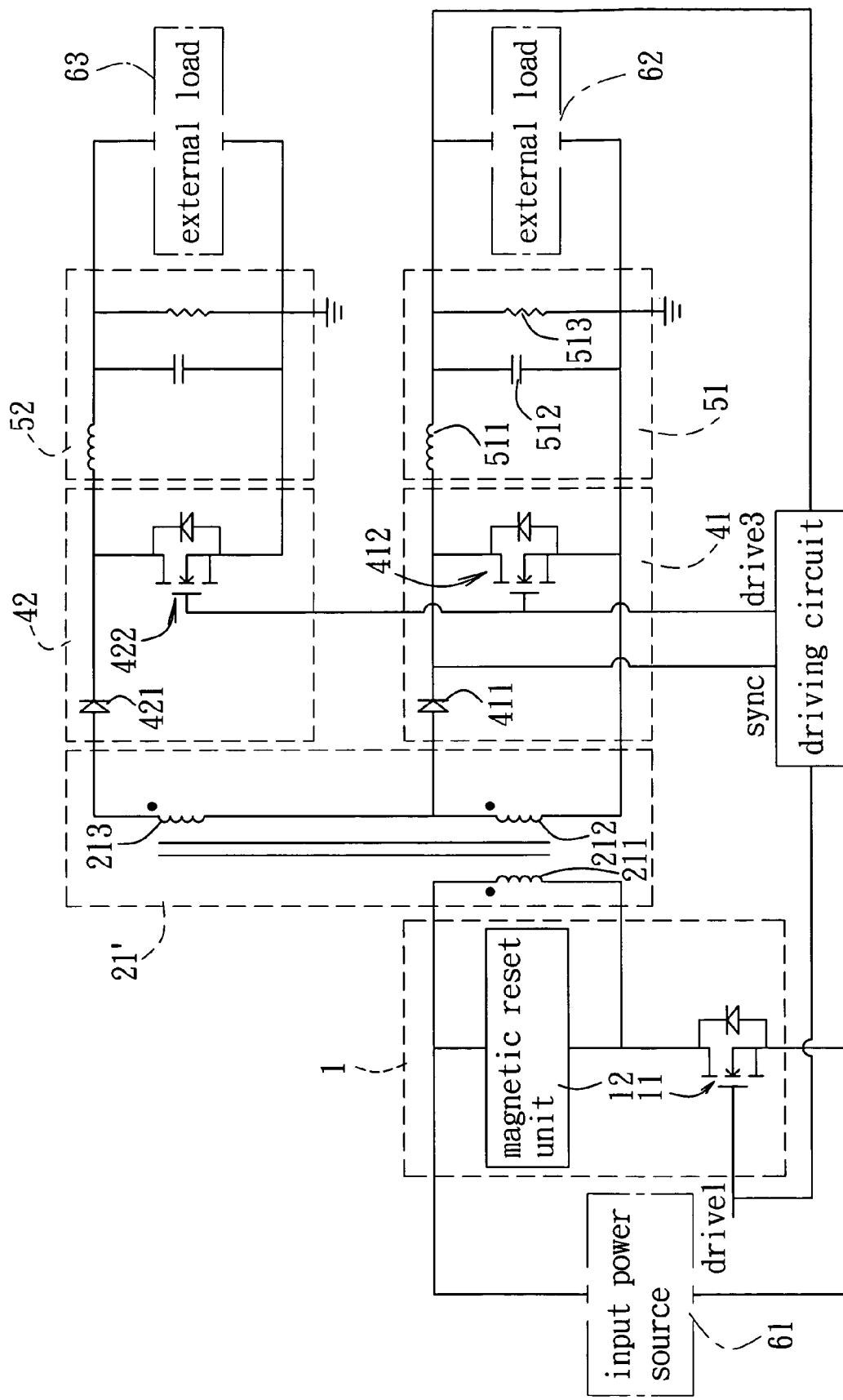
FIG. 9 is a schematic circuit diagram of the fifth preferred embodiment of a power converter according to the present invention.

With reference to FIG. 9, the fifth preferred embodiment of a power converter according to the present invention differs from the fourth preferred embodiment in that the additional secondary coil 213 has a dotted terminal connected electrically to the wave detector 421 of the second switching circuit 42, and an un-dotted terminal connected electrically to the dotted terminal of the secondary coil 212.

Figure 10:
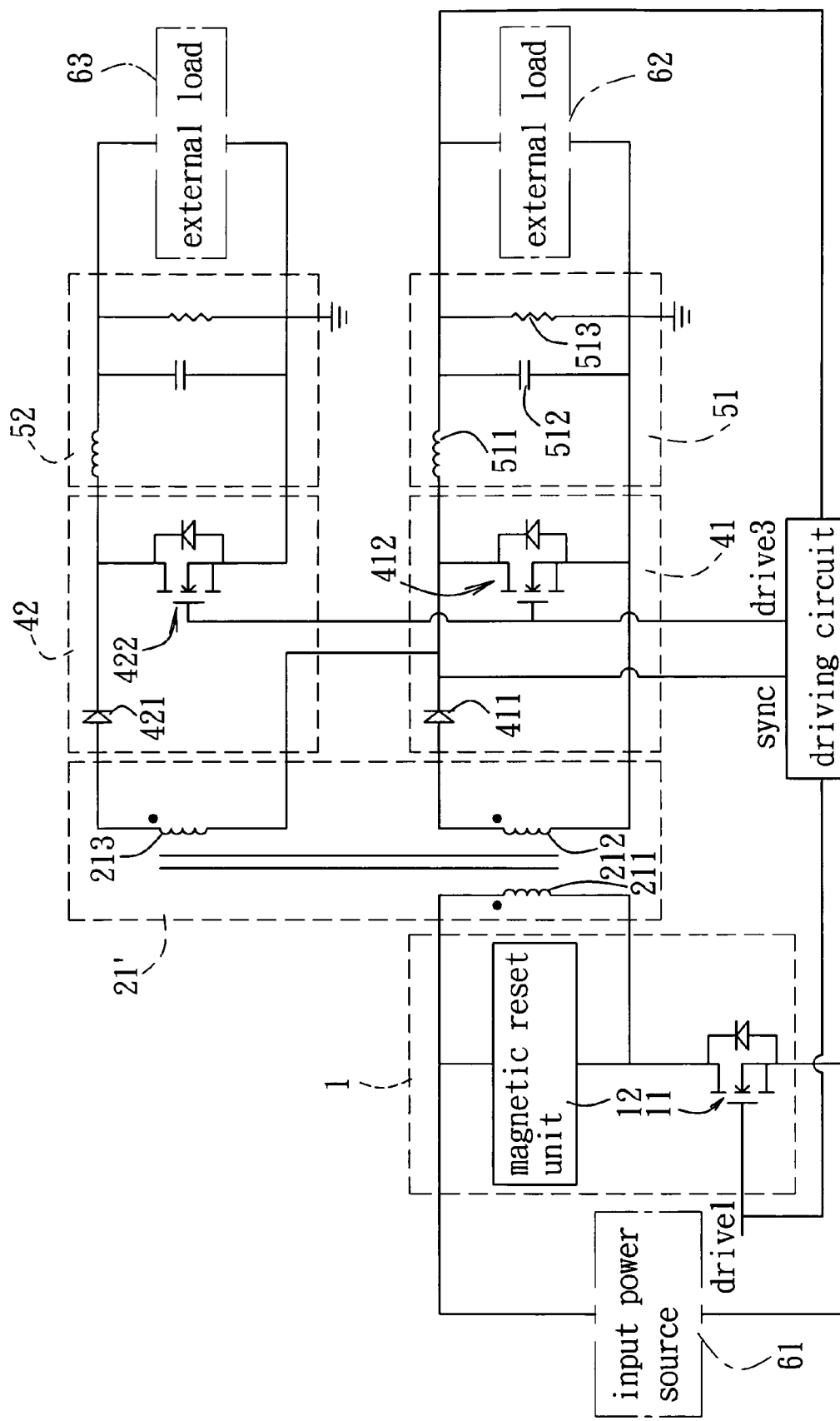
FIG. 10 is a schematic circuit diagram of the sixth preferred embodiment of a power converter according to the present invention.

With reference to FIG. 10, the sixth preferred embodiment of a power converter according to the present invention differs from the fifth preferred embodiment in that the un-dotted terminal of the additional secondary coil 213 is connected electrically to the cathode of the wave detector 411 of the first switching circuit 41.

Operations of the sixth preferred embodiment are similar to those of the fifth preferred embodiment, except that the additional secondary coil 213 is stacked with the secondary coil 212 via the wave detector 411 of the first switching circuit 41.

Figure 11:
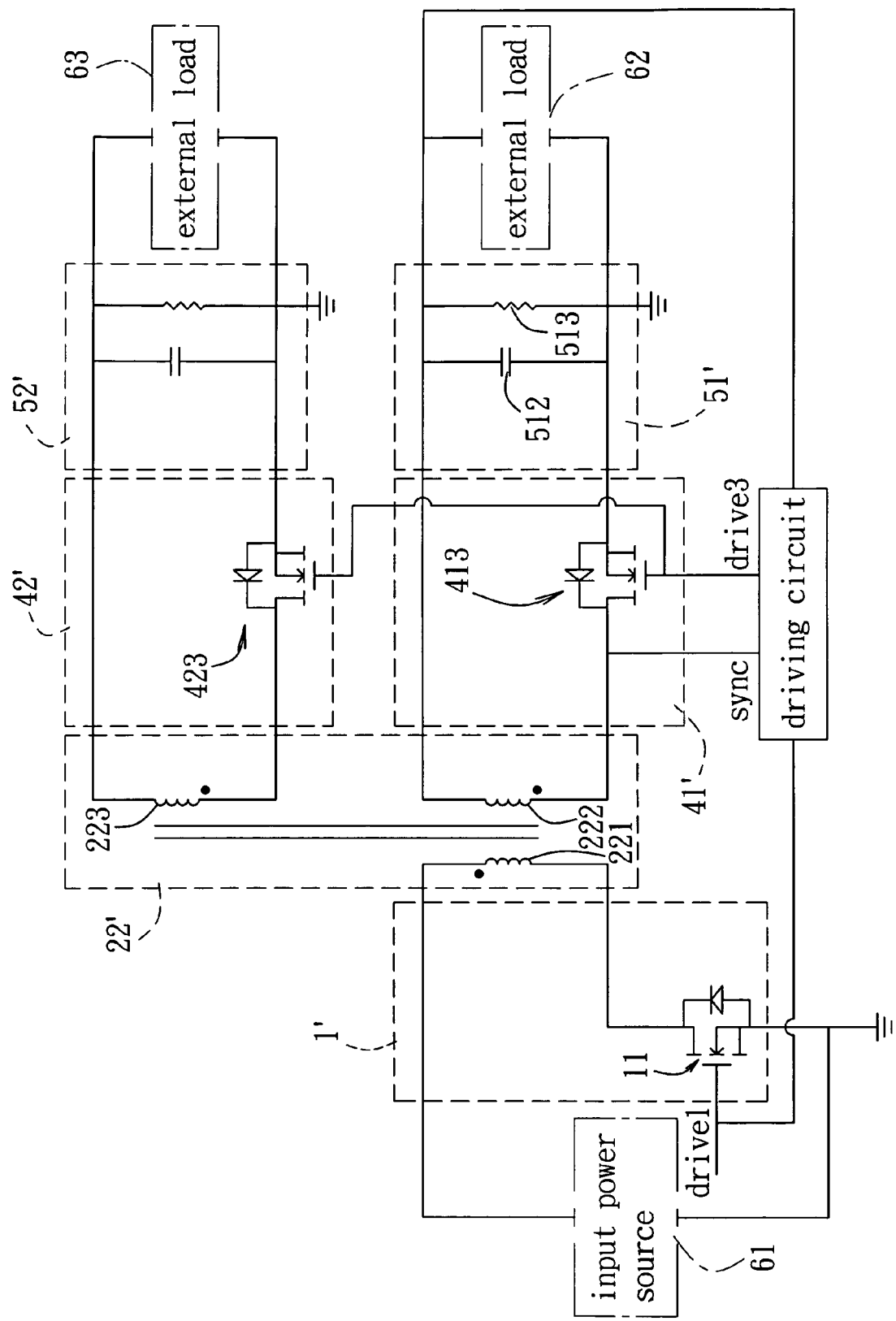
FIG. 11 is a schematic circuit diagram of the seventh preferred embodiment of a power converter according to the present invention.

With reference to FIG. 11, the seventh preferred embodiment of a power converter according to the present invention differs from the second preferred embodiment of FIG. 6 in that the main transformer 22' further includes an additional secondary coil 223, and that the seventh preferred embodiment further includes a second switching circuit 42' and a second output circuit 52' connected to another external load 63.

Since the structure of the second switching circuit 42' is similar to that of the first switching circuit 41', and the structure of the second output circuit 52' is similar to that of the first output circuit 51', further details of the same are omitted herein for the sake of brevity.

The main transformer 22' is a flyback type transformer. The secondary coils 222, 223 are respectively connected electrically in parallel to the first and second switching circuits 41', 42', and are each coupled electromagnetically to the primary coil 221.

Since operations of the seventh preferred embodiment are similar to those disclosed for the second preferred embodiment, and can be readily deduced therefrom, further details of the same are omitted herein for the sake of brevity.

Figure 12:
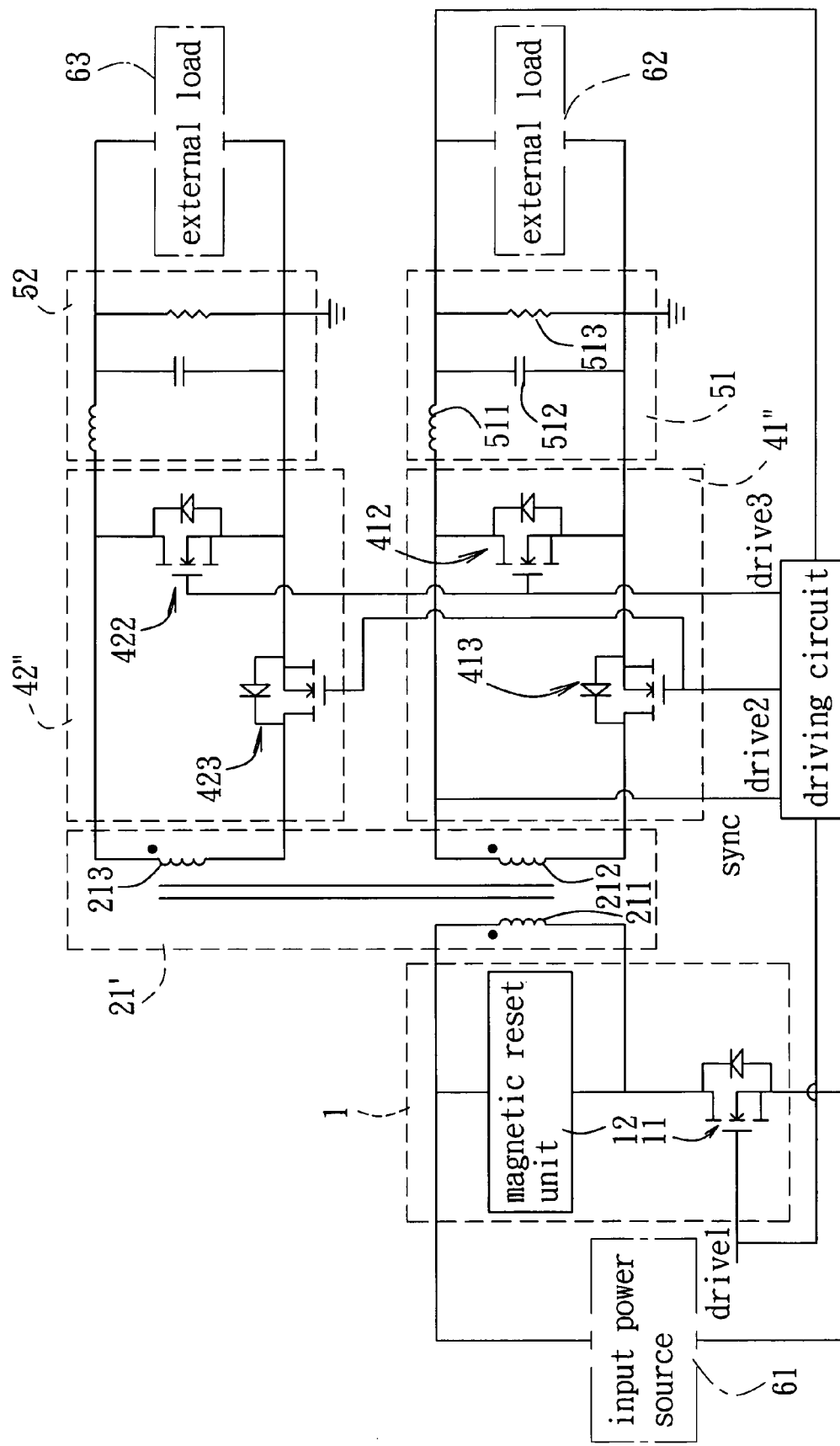
FIG. 12 is a schematic circuit diagram of the eighth preferred embodiment of a power converter according to the present invention.

With reference to FIG. 12, the eighth preferred embodiment of a power converter according to the present invention differs from the third preferred embodiment of FIG. 7 in that the main transformer 21' further includes an additional secondary coil 213, and that the eighth preferred embodiment further includes a second switching circuit 42" and a second output circuit 52 connected to another external load 63.

Since the structure of the second switching circuit 42" is similar to that of the first switching circuit 41", and the structure of the second output circuit 52 is similar to that of the first output circuit 51, further details of the same are omitted herein for the sake of brevity.

The main transformer 21' is a forward type transformer. The secondary coils 212, 213 are respectively connected electrically in parallel to the first and second switching circuits 41", 42", and are each coupled electromagnetically to the primary coil 211.

Since operations of the eighth preferred embodiment are similar to those disclosed for the third preferred embodiment, and can be readily deduced therefrom, further details of the same are omitted herein for the sake of brevity.

It should be noted herein that although in the embodiments disclosed hereinabove, the turns ratios of the primary coil 211, 221 and the secondary coil 212, 222, and of the primary coil 211, 221 and the additional secondary coil 213, 223 are all 1:1, and the turns ratio of the first isolating coil 311 and the second isolating coil 312 is also 1:1, the present invention is not limited in this aspect.

Moreover, in the embodiments disclosed hereinabove, the main switch 11 and the circuit switches 412, 413, 422, 423 are all N-type transistors. However, the switches are not limited to N-type transistors in other embodiments of the present invention. Furthermore, although in the driving circuit 3 illustrated hereinabove, the first and third switches (Q1, Q3) are N-type transistors, the second and fifth switches (Q2, Q5) are PNP bipolar junction transistors (BJTs), and the fourth switch (Q4) is an NPN BJT, the present invention is not limited thereto in other embodiments.

It should be noted herein that the driving circuit 3 can be fabricated separately from the rest of the power converter.

In sum, the driving circuit 3 of the present invention is designed to automatically correct the relative relationship between the sync signal (sync) and the third driving signal (drive3) such that the dead time exists between the falling edge of the sync signal (sync) and the rising edge of the third driving signal (drive3) and further between the falling edge of the third driving signal (drive3) and the rising edge of the sync signal (sync) so as to ensure that reverse current phenomenon does not occur and that circuit components are in sync with each other. In addition, the accelerating unit 35 of the driving circuit 3 accelerates the transition of the circuit switch 412, 413 or the circuit switches 412, 413 connected thereto from the conducting state to the non-conducting state so that driving capability is enhanced. Moreover, in contrast to the prior art, a driving chip is not necessary in the present invention for achieving the abovementioned advantages and effects, thereby reducing the manufacturing cost of the present invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A power converter adapted to be connected electrically to an input power source and an external load, and adapted for receiving a driving signal that has high and low signal levels, said power converter comprising:
   a main switch operable in one of a conducting state and a non-conducting state according to the driving signal;
   a main transformer including a primary coil adapted to be connected between the input power source and said main switch for receiving an input power supplied by the input power source when said main switch operates in the conducting state, and a secondary coil coupled electromagnetically to said primary coil;
   a switching circuit adapted to be connected electrically between said secondary coil of said main transformer and the external load for transferring energy from said main transformer to the external load, said switching circuit outputting a sync signal that has high and low signal levels, and including a circuit switch that is operable in one of a conducting state and a non-conducting state; and
   a driving circuit including
      a dead time controller connected electrically to said switching circuit, and including first and second switches, each of which is operable in one of an on state and an off state according to the sync signal outputted by said switching circuit, and
      an inverse phase generator connected to said dead time controller, and including a third switch and a fourth switch, said third switch being operable in one of an on state and an off state according to the driving signal, said fourth switch being controlled by said first and third switches to operate in one of an on state and an off state so as to result in a switching signal, said circuit switch of said switching circuit operating in one of the conducting state and the non-conducting state according to the switching signal outputted by said fourth switch;
   wherein transition of the driving signal from the high signal level to the low signal level causes said third switch to operate in the off state and the sync signal to transition from the high signal level to the low signal level, such that said first switch operates in the off state and permits operation of said fourth switch in the on state, and such that the switching signal transitions from a low signal level to a high signal level with a dead time existing between a falling edge of the sync signal and a rising edge of the switching signal;

wherein transition of the driving signal from the low signal level to the high signal level causes said third switch to operate in the on state and the sync signal to transition from the low signal level to the high signal level, such that said fourth switch is operated in the off state, and such that the switching signal transitions from the high signal level to the low signal level with a dead time existing between a falling edge of the switching signal and a rising edge of the sync signal.

2. The power converter as claimed in claim 1, wherein said driving circuit further includes an accelerating unit including a fifth switch, said accelerating unit being connected to said switching circuit and said inverse phase generator and accelerating transition of said circuit switch of said switching circuit from the conducting state to the non-conducting state when said fifth switch is turned on upon transition of the switching signal outputted by said fourth switch from the high signal level to the low signal level.

3. The power converter as claimed in claim 1, wherein said driving circuit further includes an isolator for isolating noise signals from the driving signal.

4. The power converter as claimed in claim 1, wherein said driving circuit further includes a level adjuster for performing direct current bias isolation and voltage level control processing on the driving signal, said level adjuster including a first capacitor, a first resistor and a second resistor that are connected in series to each other, and a second capacitor and a first diode that are connected in parallel to said second resistor, said first diode having a cathode that is connected between said first and second resistors.

5. The power converter as claimed in claim 1, further comprising an output circuit adapted to be connected electrically between said switching circuit and the external load, permitting transfer of energy from said switching circuit to the external load when said circuit switch of said switching circuit operates in the non-conducting state, and dissipating energy to said circuit switch of said switching circuit when said circuit switch operates in the conducting state.

6. A driving circuit adapted for receiving a sync signal and a driving signal, each having high and low signal levels, and adapted for controlling a switch, said driving circuit comprising:

a dead time controller including first and second switches, each of which is operable in one of an on state and an off state according to the sync signal; and an inverse phase generator connected to said dead time controller, and including a third switch and a fourth switch, said third switch being operable in one of an on state and an off state according to the driving signal, said fourth switch being controlled by said first and third switches to operate in one of an on state and an off state so as to result in a switching signal, the switching signal being adapted to control operation of the switch in one of a conducting state and a non-conducting state;

wherein transition of the driving signal from the high signal level to the low signal level causes said third switch to operate in the off state and the sync signal to transition from the high signal level to the low signal level, such that said first switch operates in the off state and permits operation of said fourth switch in the on state, and such that the switching signal transitions from a low signal level to a high signal level with a dead time existing between a falling edge of the sync signal and a rising edge of the switching signal;

wherein transition of the driving signal from the low signal level to the high signal level causes said third switch to operate in the on state and the sync signal to transition from the low signal level to the high signal level, such that said fourth switch is operated in the off state, and such that the switching signal transitions from the high signal level to the low signal level with a dead time existing between a falling edge of the switching signal and a rising edge of the sync signal.

7. The driving circuit as claimed in claim 6, further comprising an accelerating unit that includes a fifth switch, said accelerating unit being connected to said inverse phase generator and being adapted to accelerate transition of the switch from the conducting state to the non-conducting state when said fifth switch is turned on upon transition of the switching signal outputted by said fourth switch from the high signal level to the low signal level.

8. The driving circuit as claimed in claim 6, further comprising an isolator for isolating noise signals from the driving signal.

9. The driving circuit as claimed in claim 6, further comprising a level adjuster for performing direct current bias isolation and voltage level control processing on the driving signal, said level adjuster including a first capacitor, a first resistor and a second resistor that are connected in series to each other, and a second capacitor and a first diode that are connected in parallel to said second resistor, said first diode having a cathode that is connected between said first and second resistors.

* * * * *